United States Patent
Nagarajan et al.

(10) Patent No.: US 9,240,961 B2
(45) Date of Patent: Jan. 19, 2016

(54) VLAN BRIDGING PATH FOR VIRTUAL MACHINES IN MVRP ENVIRONMENT WITHOUT ADMINISTRATOR INTERVENTION

(71) Applicants: Anil Nagarajan, Bangalore (IN);
Sandeep Kumar, Bangalore (IN);
Arvind Kubendran, Bangalore (IN);
Jagjeet S. Bhatia, Bangalore (IN);
Edgard Vargas, Calabasas, CA (US)

(72) Inventors: Anil Nagarajan, Bangalore (IN);
Sandeep Kumar, Bangalore (IN);
Arvind Kubendran, Bangalore (IN);
Jagjeet S. Bhatia, Bangalore (IN);
Edgard Vargas, Calabasas, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 427 days.

(21) Appl. No.: 13/853,593

(22) Filed: Mar. 29, 2013

(65) Prior Publication Data
US 2014/0294012 A1    Oct. 2, 2014

(51) Int. Cl.
*H04L 12/931* (2013.01)

(52) U.S. Cl.
CPC .................................... *H04L 49/35* (2013.01)

(58) Field of Classification Search
None
See application file for complete search history.

(56) References Cited

U.S. PATENT DOCUMENTS

| | | | |
|---|---|---|---|
| 2010/0165995 A1* | 7/2010 | Mehta et al. | 370/400 |
| 2011/0096784 A1* | 4/2011 | Ramalingam | 370/395.53 |
| 2013/0121321 A1* | 5/2013 | Backes | 370/338 |

OTHER PUBLICATIONS

HP Static Virtual LANs (VLANs), Oct. 2005.*

* cited by examiner

*Primary Examiner* — Thai Nguyen
(74) *Attorney, Agent, or Firm* — Loza & Loza, LLP

(57) ABSTRACT

A bi-directional VLAN bridging path is created on an edge switch in an MVRP environment without administrator intervention using a virtual network profile (VNP) feature running on the edge switch. The VNP feature is configured to detect a device coupled to a port of the edge switch, learn the Medium Access Control (MAC) address of the device on a MVRP-VLAN and automatically convert the MVRP-VLAN to a VNP-Dynamic-VLAN corresponding to a static VLAN to create a bi-directional VLAN Port Association (VPA) for the device.

20 Claims, 4 Drawing Sheets

VLAN BRIDGING PATH FOR VIRTUAL MACHINES IN MVRP ENVIRONMENT WITHOUT ADMINISTRATOR INTERVENTION

CROSS-REFERENCE TO RELATED PATENTS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to data networks and in particular to virtual local area networks.

2. Description of Related Art

Data networks allow many different computing devices, for example, personal computers, IP telephony devices or servers to communicate with each other and/or with various other network elements or remote servers attached to the network. For example, data networks may comprise, without limitation, Metro Ethernet or Enterprise Ethernet networks that support multiple applications including, for example, voice-over-IP (VoIP), data and video applications. Such networks regularly include many interconnected nodes, commonly known as switches or routers, for routing traffic through the network.

The various nodes are often distinguished based on their location within particular areas of the network, commonly characterizing two or three "tiers" or "layers," depending on the size of the network. Conventionally, a three tier network consists of an edge layer, an aggregation layer and a core layer (whereas a two tier network consists of only an edge layer and core layer). The edge layer of data networks includes edge (also called access) networks that typically provide connectivity from an Enterprise network or home network, such as a local area network, to a metro or core network. The edge/access layer is the entry point of the network, i.e., to which the customer network is nominally attached, and the switches residing at the edge layer are known as edge switches. Different types of edge networks include digital subscriber line, hybrid fiber coax (HFC), fiber to the home, and enterprise networks, such as campus and data center networks. Edge switches may perform, for example, L2 switching functions for the attached devices. The edge switches are generally connected to one or more Enterprise switches, Enterprise servers and/or other end devices in the customer network, and may also be connected to an aggregate layer that terminates access links coming from multiple edge switches. Switches residing at the aggregation layer are known as Aggregation Switches. Aggregation Switches may perform, for example, L2 switching and L3 routing of traffic received via the aggregate links from the edge switches. The aggregate layer (in a "three tiered" network) or the edge layer (in a "two tiered" network) is connected to a metro or core network layer that performs Layer 3/IP routing of traffic received from the Aggregation Switches or from edge switches. As will be appreciated, switches at each incremental layer of the network typically have larger capacity and faster throughput.

Virtual Local Area Network (VLAN) technology has allowed Enterprise networks to extend their reach across the core network to enable a LAN to be partitioned based on functional requirements, while maintaining connectivity across all devices on the LAN. However, in order for VLAN's to forward data to the correct destination, all switches (edge and core) in the VLAN should contain the same information in their filtering databases. The IEEE 802.1ak Multiple VLAN Registration Protocol (MVRP) supports dynamic registration of VLAN's on all ports in a VLAN bridged network. In particular, MVRP allows VLAN membership information to be propagated to all ports that are a part of the active topology of the VLAN.

For example, when a VLAN is created on one of the edge switches, MVRP enables the VLAN to be propagated to all of the other edge/core switches in the Ethernet network, which creates a VPA (VLAN Port Association) on the ingress path to each edge/switch. Since VPA's are created only on the ingress of a particular edge switch, in order to provide a bi-directional path for data transfer to/from one or more customer devices in that VLAN that are coupled to that particular edge switch, an administrator can manually configure the edge switch by converting the MVRP-VLAN on the edge switch to a standard (static) VLAN. Once converted, the VLAN is propagated back in the reverse direction, creating VPA's on the reverse path and resulting in a complete VLAN path.

MVRP works well for traditional physical customer devices that are tied to a specific port or switch. However, many Enterprise networks have begun utilizing "Virtual Machines (VMs)" to emulate physical network devices for various purposes, such as testing/debugging, system backup, virtual desktops, on-demand applications and process mobility. Since Virtual Machines are mobile and can potentially move to different edge switches, administrator intervention would be required on each edge switch where the Virtual Machine moves to manually convert the MVRP-VLAN's on those switches to static VLAN's. Manually configuring switches in the Ethernet network based on current locations of VM's requires extensive labor and time, thus increasing the cost of managing VLAN's.

Accordingly, there is a need for systems and methods for creating a VLAN bridging path for Virtual Machines (VMs) within an MVRP environment without the need for administrator intervention.

DETAILED DESCRIPTION OF THE INVENTION

Figure 1:
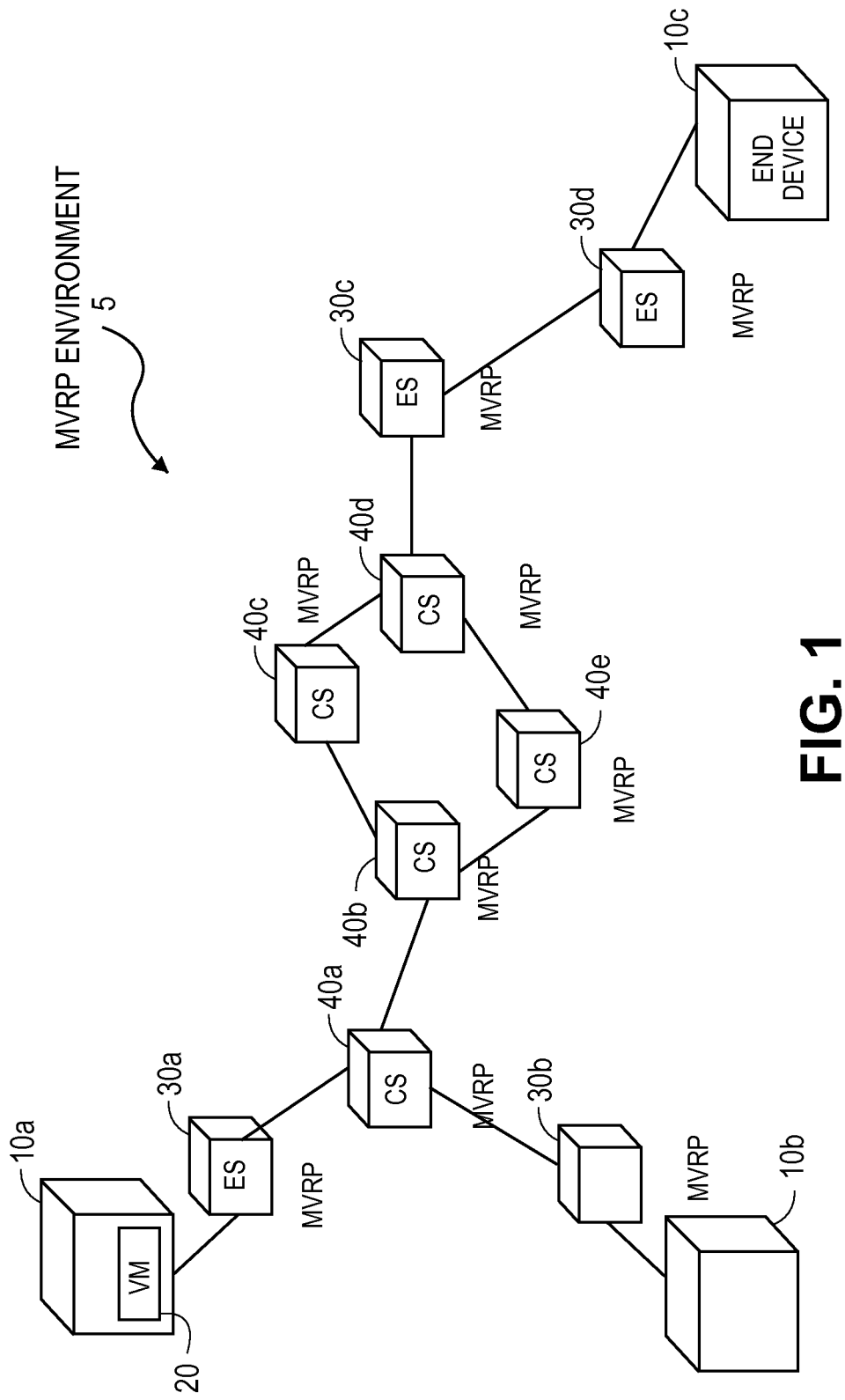
FIG. 1 illustrates a schematic block diagram of an embodiment of a MVRP environment in accordance with the present invention.

FIG. 1 illustrates an embodiment of an MVRP environment 5 in accordance with the present invention. The MVRP environment 5 shown in FIG. 1 represents a "two tiered" Ethernet network, including an edge layer and a core layer. However, it should be noted that the MVRP environment 5 may include additional layers, such as an aggregation layer.

The edge layer includes edge switches 30a-30d that provide connectivity from customer devices 10a-10c within an Enterprise network to the core network. The edge switches 30a-30d may perform, for example, L2 switching functions for the customer devices 10a-10c. The customer devices 10a-10c may include, for example, one or more Enterprise switches, Enterprise servers and/or other customer/end devices in the customer network. The core network layer includes a plurality of core switches 40a-40e that perform Layer 3/IP routing of traffic received from the edge switches 30a-30d. In addition, MVRP is enabled on each of the edge switches 30a-30d and core switches 40a-40e to provide for dynamic configuration of VLAN's thereon.

In the MVRP environment shown in FIG. 1, one of the customer devices 10a is a physical server on which at least one virtual machine 20 is running The virtual machine (VM) 20 connects to edge switch (ES) 30a, and may be associated with a particular Virtual Local Area Network (VLAN) of the enterprise network. The VM VLAN may be the same as or different than a VLAN associated with the server 10a. In addition, multiple VM's 20 may be included on the same server 10a, and each of the VM's may be associated with a different respective VLAN.

Figure 2:
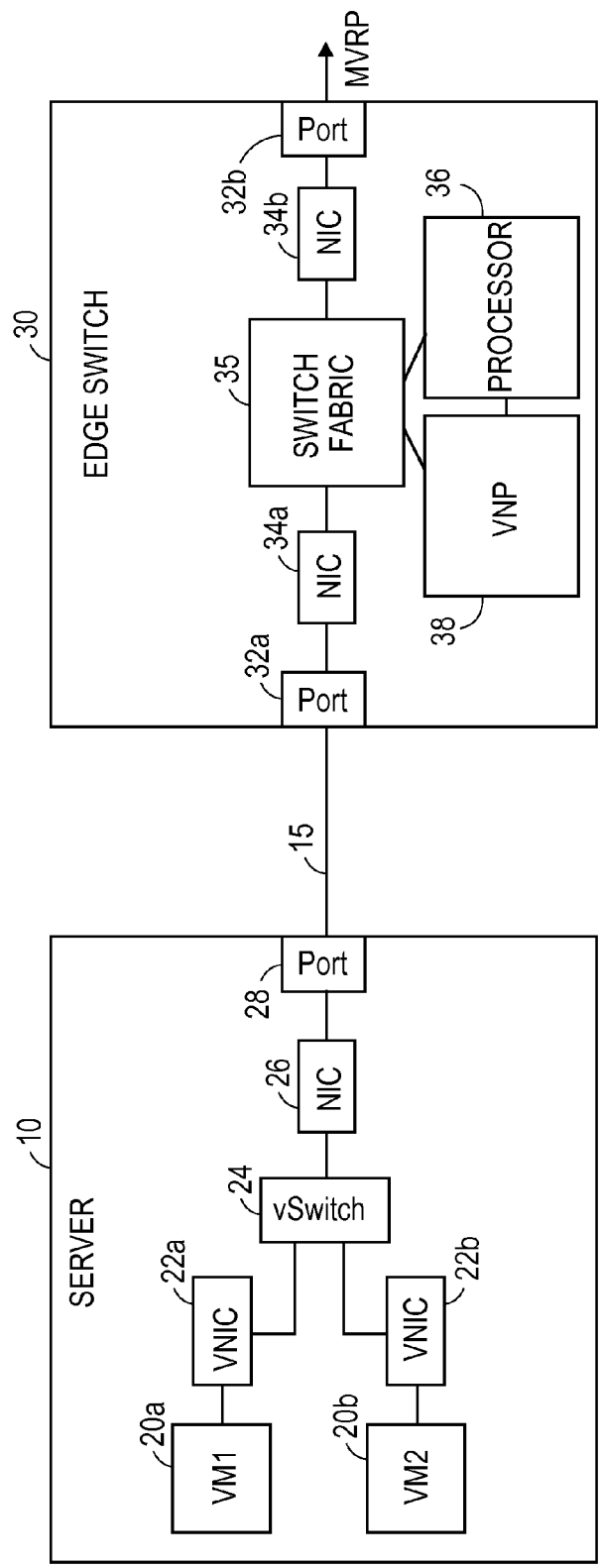
FIG. 2 illustrates a schematic block diagram of an embodiment of virtual machines connected to an edge switch in an MVRP environment in accordance with the present invention.

For example, as shown in FIG. 2, a physical server 10 is running two VM's (VM1 20a and VM2 20b). Each VM (VM1 20a and VM2 20b) is associated with a respective virtual network interface card (vNIC) 22a and 22b that enables both VM1 20a and VM2 20b to share the same physical network interface card (NIC) 26 and port 28. A virtual switch (vSwitch) 24 running on the server 10 maps the virtual NIC's 22a and 22b to the physical NIC 26 and port 28.

The edge switch 30 is coupled to the server 10 via a physical link 15 (Ethernet link), which terminates at port 28 on the server 10 and at port 32a on the edge switch 30. The edge switch 30 further includes NIC's 34a and 34b, at least one additional port 32b coupled to the MVRP environment (i.e., other core/edge switches), switch fabric 35, a processor 36 and a virtual network profile (VNP) module 38 that implements a VNP feature in accordance with embodiments of the present invention. As used herein, the term "processor" is generally understood to be a device that drives a general-purpose computer. It is noted, however, that other processing devices, such as microcontrollers, Field Programmable Gate Arrays (FPGAs), Application Specific Integrated Circuits (ASICs), or a combination thereof, can be used as well to achieve the benefits and advantages described herein.

The VNP module 38 includes an algorithm executable by the processor 36 to propagate VLAN's associated with virtual machines throughout the MVRP environment. The VNP module 38 may be stored, for example, in a non-transitory memory device within edge switch 30. By way of example, but not limitation, the non-transitory memory device may include one or more of a data storage device, random access memory (RAM), read only memory (ROM), flash memory, compact disc, ZIP™ drive, tape drive, database or other type of storage device or storage medium.

The VNP module 38 is a dynamic VLAN Port Association (VPA) manager. For example, the VNP module 38 detects virtual machines, authenticates a virtual machine on a particular MVRP-VLAN and dynamically converts the MVRP-VLAN to a different type of VLAN, hereinafter referred to as a VNP-Dynamic-VLAN, which corresponds to a static VLAN within the Ethernet network. The conversion to the VNP-Dynamic-VLAN triggers a bi-directional path for the VLAN to/from the virtual machine.

To enable the dynamic conversion of MVRP-VLAN's to VNP-Dynamic-VLAN's, the VNP module 38 includes a Dynamic Profile Configuration (DPC) module that creates and maintains profiles for VLAN's and associates MVRP-VLAN's with the profiles. For example, a particular profile can include the VNP-Dynamic-VLAN configuration for a particular MVRP-VLAN to enable a switch to create a bi-directional VLAN path for the MVRP-VLAN. Each profile can further have a list of MAC addresses associated therewith, and the VNP module 38 can, for example, perform a remote or local database lookup to determine the profile associated with a particular MAC address. Upon accessing the profile for a particular MAC address, the VNP module 38 further includes a Dynamic VLAN Configuration (DVC) module that converts the MVRP-VLAN to the VNP-Dynamic-VLAN based on the profile.

Figure 3:
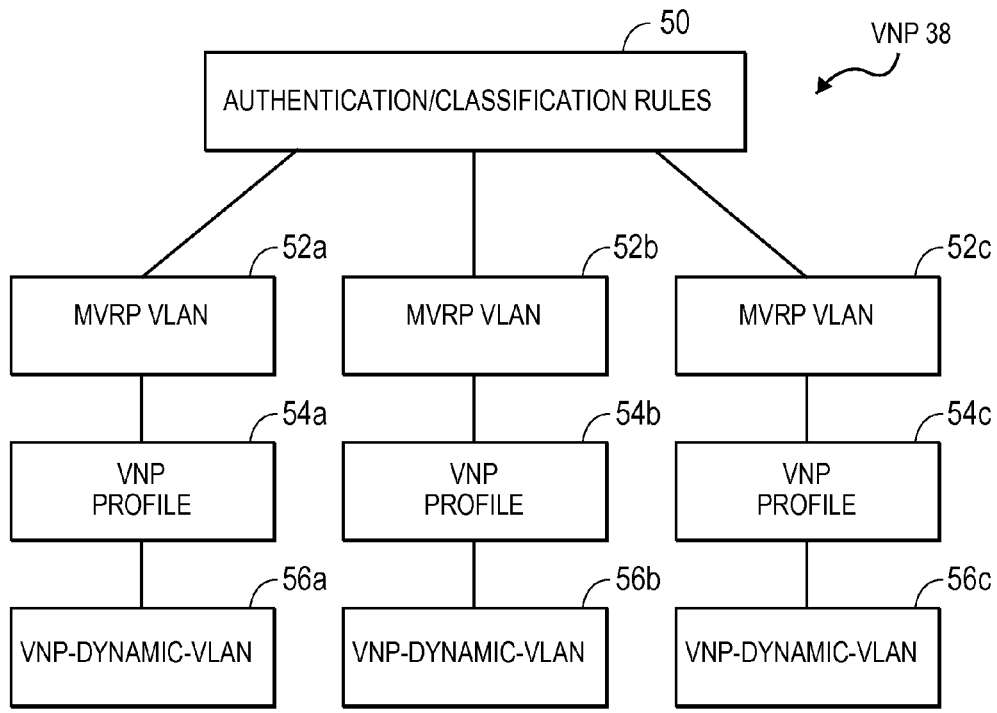
FIG. 3 illustrates an embodiment of a dynamic VLAN configuration based on a virtual network profile in accordance with the present invention.

In addition to creating and applying profiles, as shown in FIG. 3, the VNP module 38 can further create and apply authentication and/or classification rules 50. For example, the VNP module 38 can create different methods of authentication of MAC addresses and provide/implement various policy enforcement methods based on any number of rules. The authentication and/or classification rules 50 are utilized by the VNP module 38 to match MAC addresses with corresponding MVRP-VLANs 52a-52c. Each MVRP-VLAN 52a-52c has a profile 54a-54c associated therewith that provides conversion/configuration information to enable a switch to automatically convert the MVRP-VLAN 52a-52c to the corresponding VNP-Dynamic-VLAN 56a-56c without administrator intervention.

Turning again to FIG. 2, in an exemplary operation, port 32a on edge switch 30 is a VNP-enabled port. Thus, when a device, such as VM1 20a, is first detected on port 32a (e.g., by VM1 20a sending traffic over link 15 to port 32a), the processor 36 executes the VNP module 38 to automatically (without administrator intervention) create a bi-directional path for VM1 20a. In embodiments in which the traffic is untagged (i.e., a VLAN identifier is not included in the data frames sent by VM1 20a), the processor 36 extracts the MAC address of VM1 20a from the received data frames, and the VNP module 38 applies authentication/classification rules to the MAC address of VM1 20a to determine the MVRP-VLAN associated with the MAC address. Once the MAC address of VM1 20a is learned on port 32a as being associated with a particular MVRP-VLAN, the VNP module 38 accesses the profile for that MVRP-VLAN, converts the MVRP-VLAN to the VNP-Dynamic-VLAN, as indicated by the profile, and creates a VPA on port 32a for VM1 20a, which results in the creation of bi-directional VLAN path for VM1 20a.

In embodiments in which the traffic sent from VM1 20a is tagged, the MAC address of VM1 20a may be learned on the MVRP-VLAN based on the VLAN identifier included in the data frames. For example, in one embodiment, port 32a may be configured as a "trust-tag" port to ensure that VLAN tags are always trusted on this port 32a. In this embodiment, after learning the MAC address of VM1 20*a* in hardware on the MVRP-VLAN, the VNP module 38 determines the profile associated with the MVRP-VLAN, converts the MVRP-VLAN to a VNP-Dynamic-VLAN based on the profile and creates a VPA on the port 32*a* for VM1 20*a*.

Once a bi-directional path is created for VM1 20*a*, traffic can be switched via switch fabric 35 between port 32*a* and port 32*b* to/from VM1 20*a* and the MVRP environment. It should be noted that if VNP is enabled on port 32*a*, the VNP algorithm would be applied to any device detected on port 32*a*, regardless of whether the device is a VM or a traditional physical customer device. In one embodiment, the network administrator can configure classification rules based on MAC addresses to determine whether a detected device is a VM or not. In other embodiments, the network administrator can implement the "trust tag" configuration on port 32*a*, as described above, in which case all tagged traffic will be learned successfully without the need to match any classification rules or undergo authentication.

Figure 4:
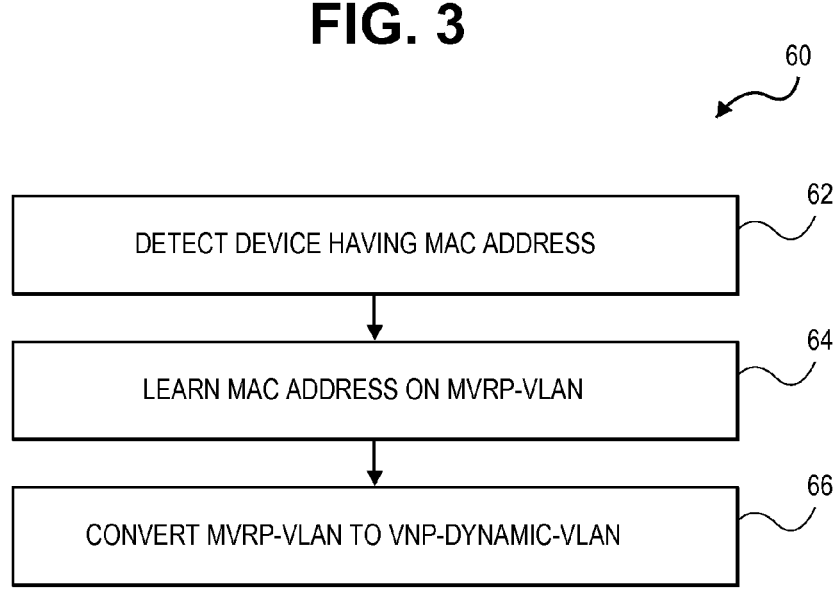
FIG. 4 illustrates an exemplary flow diagram of a method for creating a bi-directional VLAN bridging path within an MVRP environment in accordance with the present invention.

FIG. 4 illustrates an exemplary flow diagram of a method 60 for creating a bi-directional VLAN bridging path within an MVRP environment in accordance with the present invention. The method begins at 62, where an edge switch detects a device coupled to a port thereof. At 64, a VNP module within the edge switch learns the MAC address of the device on a particular MVRP-VLAN (i.e., tagged on an MVRP-VLAN or untagged and associated with an MVRP-VLAN after authentication/classification). To create the bi-directional path, at 66, the VNP module converts the MVRP-VLAN to a VNP-Dynamic-VLAN corresponding to a static VLAN in the MVRP environment and creates the VPA on the port.

Figure 5:
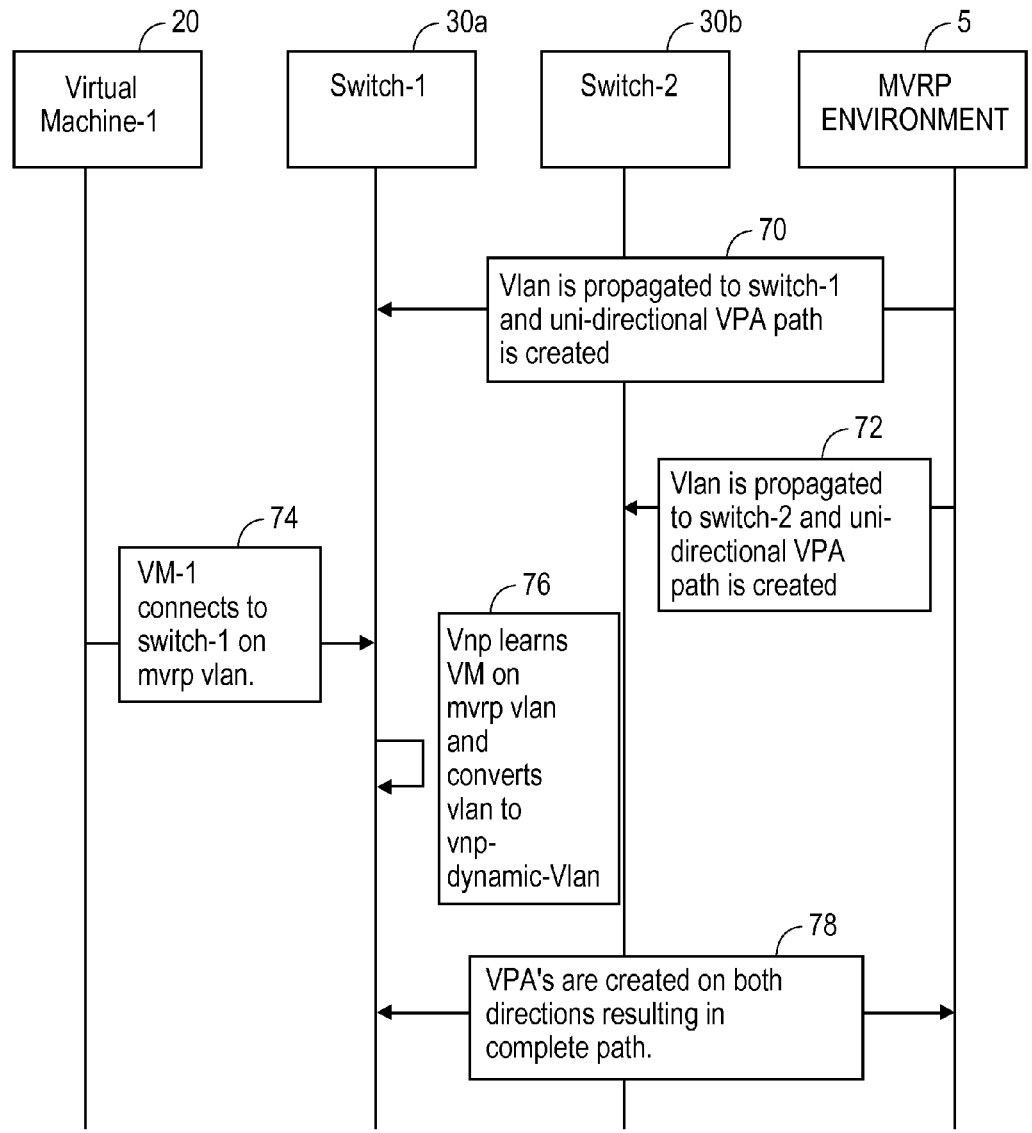
FIG. 5 illustrates an exemplary signaling diagram for creating a bi-directional VLAN bridging path within an MVRP environment in accordance with the present invention.

FIG. 5 illustrates an exemplary signaling diagram for creating a bi-directional VLAN bridging path within an MVRP environment in accordance with the present invention. At 70 and 72, the MVRP environment 5 propagates an MVRP-VLAN to edge switches (Switch-1 30*a* and Switch-2 30*b*) within the Ethernet network to create a uni-directional VPA path (ingress path only) for the VLAN towards edge switches 30*a* and 30*b*. At 74, Virtual Machine-1 (VM1) connects to Switch-1 30*a* on the MVRP-VLAN. At 76 and 78, Switch-1 learns VM1 on the MVRP-VLAN, converts the MVRP-VLAN to the VNP-Dynamic-VLAN and creates bi-directional VPA's, thus resulting in a complete VLAN path through Switch-1 30*a*.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/ or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may also be used herein, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A switch within an Ethernet network, comprising:
   a port for coupling to an Ethernet link; and
   a processor coupled to the port and configured to execute a virtual network profile (VNP) algorithm for the port to:
      detect a virtual machine configured on a device coupled to the port via the Ethernet link;
      learn a Medium Access Control (MAC) address of the virtual machine and an associated Multiple Virtual Local Area Network Registration Protocol—Virtual Local Area Network (MVRP-VLAN), wherein the MVRP-VLAN is a dynamic type of VLAN; and
      automatically convert the MVRP-VLAN dynamic type of VLAN to a corresponding VNP-Dynamic-VLAN static type of VLAN within the Ethernet network to create a bi-directional VLAN Port Association (VPA) for the virtual machine.

2. The switch of claim 1, wherein the processor further executes the VNP algorithm to:
   create a profile for the VNP-Dynamic-VLAN; and
   associate the MVRP-VLAN to the profile.

3. The switch of claim 2, wherein the processor further executes the VNP algorithm to:
   apply authentication and classification rules to the MAC address of the virtual machine to identify the profile for the VNP-Dynamic VLAN and learn the MVRP-VLAN associated with the MAC address of the virtual machine.

4. The switch of claim 1, wherein the processor further executes the VNP algorithm to:
  determine the MAC address of the virtual device is tagged to the MVRP-VLAN to learn the MAC address on the MVRP-VLAN.

5. The switch of claim 1, wherein the processor is further configured to execute the VNP algorithm to:
  detect an additional virtual machine coupled to the port via the Ethernet link;
  learn a Medium Access Control (MAC) address of the additional virtual machine on an additional MVRP-VLAN; and
  automatically convert the additional MVRP-VLAN to an additional VNP-Dynamic-VLAN corresponding to an additional static VLAN within the Ethernet network to create a bi-directional VLAN Port Association (VPA) for the additional virtual machine.

6. The switch of claim 5, wherein the additional MVRP-VLAN associated with the additional virtual machine is different from the MVRP-VLAN associated with the virtual machine.

7. The switch of claim 6, wherein processor further executes the VNP algorithm to:
  create an additional profile for the additional VNP-Dynamic-VLAN; and
  associate the additional MVRP-VLAN to the additional profile.

8. The switch of claim 7, wherein the processor further executes the VNP algorithm to:
  apply authentication and classification rules to the MAC address of the additional virtual machine to identify the additional profile and learn the MAC address on the additional MVRP-VLAN.

9. The switch of claim 1, wherein the switch is an edge switch within the Ethernet network.

10. The switch of claim 1, wherein the processor is further configured to enable the MVRP-VLAN to be propagated to the switch via the Ethernet network to create a uni-directional path to the switch through the Ethernet network prior to detecting the virtual machine on the port.

11. A method for dynamic configuration of a Virtual Local Area Network (VLAN) path within an Ethernet network, comprising:
  detecting, at a switch within the Ethernet network, a virtual machine configured on a device coupled to a port of the switch;
  learning a Medium Access Control (MAC) address of the virtual machine associated with a Multiple Virtual Local Area Network Registration Protocol—Virtual Local Area Network (MVRP-VLAN), wherein the MVRP-VLAN is a dynamic type of VLAN; and
  automatically converting the MVRP-VLAN to a corresponding VNP-Dynamic-VLAN within the Ethernet network to create a bi-directional VLAN Port Association (VPA) for the virtual machine, wherein the VNP-Dynamic-VLAN is a static VLAN.

12. The method of claim 11, further comprising:
  creating a profile for the VNP-Dynamic-VLAN; and
  associating the MVRP-VLAN to the profile.

13. The method of claim 12, further comprising:
  applying authentication and classification rules to the MAC address of the virtual machine to identify the profile and learn the MAC address on the MVRP-VLAN.

14. The method of claim 12, further comprising:
  determining the MAC address of the virtual machine is tagged to the MVRP-VLAN to learn the MAC address on the MVRP-VLAN.

15. The method of claim 11, further comprising:
  detecting an additional virtual machine coupled to the port of the switch;
  learning a Medium Access Control (MAC) address of the additional virtual machine associated with an additional MVRP-VLAN; and
  automatically converting the additional MVRP-VLAN to an additional VNP-Dynamic-VLAN corresponding to an additional static VLAN within the Ethernet network to create a bi-directional VLAN Port Association (VPA) for the additional virtual machine.

16. The method of claim 15, wherein the additional MVRP-VLAN associated with the additional virtual machine is different from the MVRP-VLAN associated with the virtual machine.

17. The method of claim 16, further comprising:
  creating an additional profile for the additional VNP-Dynamic-VLAN;
  associating the additional MVRP-VLAN to the additional profile; and
  applying authentication and classification rules to the MAC address of the additional virtual machine to identify the additional profile and learn the MAC address on the additional MVRP-VLAN.

18. The method of claim 11, further comprising:
  enabling the MVRP-VLAN to be propagated to the switch via the Ethernet network to create a uni-directional path to the switch through the Ethernet network prior to detecting the virtual machine on the port.

19. A switch operable in an Ethernet network, comprising:
  a port configured to communicate via an Ethernet link; and
  at least a processor configured to:
    detect a virtual machine operating on a device communicating with the port via the Ethernet link;
    learn a Medium Access Control (MAC) address of the virtual machine and a dynamic virtual local area network (VLAN) associated with the MAC address;
    access a profile associated with the dynamic VLAN to determine a corresponding static VLAN; and
    automatically convert the dynamic VLAN to the static VLAN, wherein the static VLAN creates a bi-directional VLAN path for the device in the Ethernet network.

20. The switch of claim 19, further comprising:
  a module that maintains a plurality of VLAN profiles, wherein the profile is one of the plurality of VLAN profiles and includes configuration information for the static VLAN and the dynamic VLAN associated with the profile.

* * * * *